United States Patent
Hauck et al.

(10) Patent No.: US 6,896,551 B2
(45) Date of Patent: May 24, 2005

(54) POWER LINE PHASE COUPLER SYSTEM

(75) Inventors: Douglas L. Hauck, Richardton, ND (US); David L. Kvidt, Albert Lea, MN (US); Jeff L. Johnson, West Fargo, ND (US)

(73) Assignee: Echelon Corporation, San Jose, CA (US)

( * ) Notice: Subject to any disclaimer, the term of this patent is extended or adjusted under 35 U.S.C. 154(b) by 0 days.

(21) Appl. No.: 09/746,330

(22) Filed: Dec. 22, 2000

(65) Prior Publication Data

US 2004/0108941 A1 Jun. 10, 2004

(51) Int. Cl.[7] .............................................. H01R 13/66
(52) U.S. Cl. ...................... 439/620; 439/651; 439/217; 340/310.1; 361/66; 361/85
(58) Field of Search ...................... 340/310.06, 310.08, 340/310.01; 439/956, 166, 217, 218, 620, 638, 518, 651; 361/66, 68, 59, 81, 85

(56) References Cited

U.S. PATENT DOCUMENTS

| | | | |
|---|---|---|---|
| 3,439,308 A | 4/1969 | Swartout | |
| 3,629,662 A | 12/1971 | Cattey et al. | |
| 4,126,369 A | 11/1978 | Rapata et al. | |
| 4,178,617 A | 12/1979 | Reichel | |
| 4,239,319 A | 12/1980 | Gladd et al. | |
| 4,428,633 A | 1/1984 | Lundergan et al. | |
| 5,070,442 A | * 12/1991 | Syron-Townson et al. | 340/310.01 |
| 5,187,865 A | 2/1993 | Dolin, Jr. | 29/868 |
| 5,192,231 A | 3/1993 | Dolin, Jr. | 439/620 |
| 5,838,226 A | * 11/1998 | Houggy et al. | 340/310.01 |
| 6,126,463 A | * 10/2000 | Okazaki et al. | 439/188 |
| 6,576,833 B2 | * 6/2003 | Covaro et al. | 174/35 GC |

* cited by examiner

*Primary Examiner*—Ross Gushi
*Assistant Examiner*—Briggitte R. Hammond
(74) *Attorney, Agent, or Firm*—Blakely, Sokoloff, Taylor & Zafman LLP

(57) ABSTRACT

A power line phase coupler system for repeating data signals between power line phases that can be easily installed by a user. The power line phase coupler system includes a housing, a female connector positioned within the housing, a male connector electrically connected to the female connector by a length of cord, and a repeater coupler electrically connected to the male connector. The repeater coupler is electrically connected between Phase A and Phase B of the male connector for repeating and amplifying a data signal received from either phase to the opposite phase.

27 Claims, 11 Drawing Sheets

POWER LINE PHASE COUPLER SYSTEM

BACKGROUND OF THE INVENTION

1. Field of the Invention

The present invention relates generally to power line phase couplers and more specifically it relates to a power line phase coupler system for repeating data signals between power line phases that can be easily installed by a user.

Power line communication (PLC) is utilized to connect various electronic devices within a building structure via the electrical power system of the building. Networking of these electronic device may utilize two different but complementary PLC technologies: one for high speed data communication (computer networking, printer sharing, Internet connection, etc.) and one for control applications (designed for the lowest possible cost). Data communication applications have requirements that are completely different from control applications. Regardless of the PLC technology utilized, a home utilizing a multi-phase power line system creates several communication problems for the devices connected to the separate power line phases.

2. Description of the Prior Art

Electronic devices are commonly utilized in residential and commercial buildings to transmit data signals along the power lines of the building (i.e. power line communications). Most conventional electronic devices are electrically coupled to a single phase of the power lines of the building by simply inserting the male plug of the device into a female receptacle of a wall socket. The data signals are relatively low power signals are transmitted by a transmitter device and received by a receiver device positioned upon the same power line phase to accomplish various tasks such as turning on an appliance or adjusting the temperature within the building. The data signals are typically transmitted at relatively high frequencies typically greater than 1 KHz to reduce interference with the power line frequency of 60 Hz in North America (or 50 Hz elsewhere). LEVITON is one company that manufactures a variety of electronic devices that communicate via a building's power line system (http://www.leviton.com). There are various other manufacturers of power line communication devices such as ACT, Interactive Technologies, Inc. (ITI), Home Automation, Inc. (HAI), and X-10 PRO.

The most commonly utilized power line system within residential buildings in North America is 60 Hz, 120/240-volt split-single phase power. This power line system is basically comprised of two "phases" of power provided by three wires represented by (1) Phase A, (2) Phase B, and (3) Neutral. Phase A and Phase B of the power line system are approximately 180 degrees out of phase with respect to one another. Each of the phases carries approximately 110 to 120 volts of alternating current with respect to the neutral line. Since the phases are 180 degrees out of phase with one another the total voltage between the two phases is 240 volts. U.S. Pat. Nos. 5,192,231 and 5,187,865 provide an overview of conventional power line systems.

Since most wall outlets within building structures are "single phase" outlets (i.e. electrically connected to only one phase and ground), the data signal transmitted by the transmitter device is only transmitted along the power line phase electrically coupled to and not the other power line phase. "Natural" coupling for the data signal sometimes occur by passing passively through a phase-to-phase load (e.g. electric 240 volt water heater or stove) or through a transformer. However, consistent and reliable natural coupling is difficult to achieve and typically is not feasible for a reliable system to be implemented. Natural coupling is especially difficult to achieve in larger buildings that have numerous electronic devices connected to power outlets within the building.

To provide adequate communications for the data signal between the two phases of the building, it is often times desirable to "couple" the phases together at the breaker panel. The two most commonly utilized systems of coupling the two phases within a building structure are comprised of (1) passive couplers and (2) repeater couplers.

"Passive" couplers are typically comprised of a capacitor electrically coupled between the two phases at the breaker panel. Passive couplers do not enhance the data signal during bridging between the phases and many times a passive coupler will actually reduce the signal strength of the data signal. Utilizing a passive coupler can be difficult since the capacitor may allow the lower power frequencies and other data signals to undesirably pass between the phases. In addition, coupling the phases together at the breaker panel with a passive coupler can be difficult and dangerous even for skilled professionals. Also, the signal strength of the data signal is weakened after passing through a passive coupler and sometimes cannot be detected by a receiver device. In larger building structures a passive coupler simply is not acceptable to maintain the desirable signal strength of the receiver devices. U.S. Pat. Nos. 5,192,231 and 5,187,865 illustrate utilizing a passive coupler system that engages a wall outlet utilizing a capacitor for coupling the two phases but has the same problems as breaker panel passive couplers.

The most reliable type of power line coupler utilized today are "repeater couplers" which are electrically connected between the two phases at the breaker panel. Repeater couplers detect a data signal upon one of the phases. The repeater then amplifies and repeats the detected data signal to the second phase of the power line system. The repeated data signal is "tagged" with an identifier to prevent repeating of the already repeated data signal if received by the repeater coupler again. The LEVITON 6201 system coupler repeater is an exemplary example of a repeater coupler and is incorporated by reference into this application for the purpose of disclosing a suitable repeater coupler. The LEVITON 6201 takes data signals generated on the 120-volt line phase from which the LEVITON 6201 draws power, then boosts the data signals at the zero crossing on the other line phase of a 120/240-volt or any phase of a three-phase 120/208-volt residential wiring network. The LEVITON 6201 is typically installed at the main breaker panel, on its own dedicated 15 amp breaker (per National Electrical Code).

While these devices may be suitable for the particular purpose to which they address, they are not as suitable for repeating data signals between power line phases that can be easily installed by a user. The main problem with passive couplers is that they are not suitable for usage within larger building structures or where numerous electrical devices are connected within. The main problem with conventional repeater couplers is that they are designed to be utilized only within a main breaker panel and are not easy to utilize for most consumers.

In these respects, the power line phase coupler system according to the present invention substantially departs from the conventional concepts and designs of the prior art, and in so doing provides an apparatus primarily developed for the purpose of repeating data signals between power line phases that can be easily installed by a user.

SUMMARY OF THE INVENTION

In view of the foregoing disadvantages inherent in the known types of power line couplers now present in the prior art, the present invention provides a new power line phase coupler system construction wherein the same can be utilized for repeating data signals between power line phases that can be easily installed by a user.

The general purpose of the present invention, which will be described subsequently in greater detail, is to provide a new power line phase coupler system that has many of the advantages of the power line couplers mentioned heretofore and many novel features that result in a new power line phase coupler system which is not anticipated, rendered obvious, suggested, or even implied by any of the prior art power line couplers, either alone or in any combination thereof.

To attain this, the present invention generally comprises a housing, a female connector positioned within the housing, a male connector electrically connected to the female connector by a length of cord, and a repeater coupler electrically connected to the male connector. The repeater coupler is electrically connected between Phase A and Phase B of the male connector for repeating and amplifying a data signal received from either phase to the opposite phase.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a power line phase coupler system that will overcome the shortcomings of the prior art devices.

A second object is to provide a power line phase coupler system for repeating data signals between power line phases that can be easily installed by a user.

Another object is to provide a power line phase coupler system that is not connected to the main breaker panel of a building.

A further object is to provide a power line phase coupler system that can be connected so as to not physically interfere with surrounding electrical appliances.

Another object is to provide a power line phase coupler system that does not require installation by an electrician or other skilled professional.

An additional object is to provide a power line phase coupler system that can be utilized within larger building structures with longer power line systems.

A further object is to provide a power line phase coupler system that can be utilized within buildings with numerous electrical devices connected to the power line system of the building.

Another object is to provide a power line phase coupler system that amplifies and repeats the data signal received by a transmitter device from a first power line phase to a second power line phase at an increased level.

A further object is to provide a power line phase coupler system that increases the overall communication efficiency of power line communication devices.

An additional object is to provide a power line phase coupler system that provides a simple, easy and convenient system to link the entire wiring of a building together for the purposes of providing a network for communication and control of devices electrically connected to the power line system of the building.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
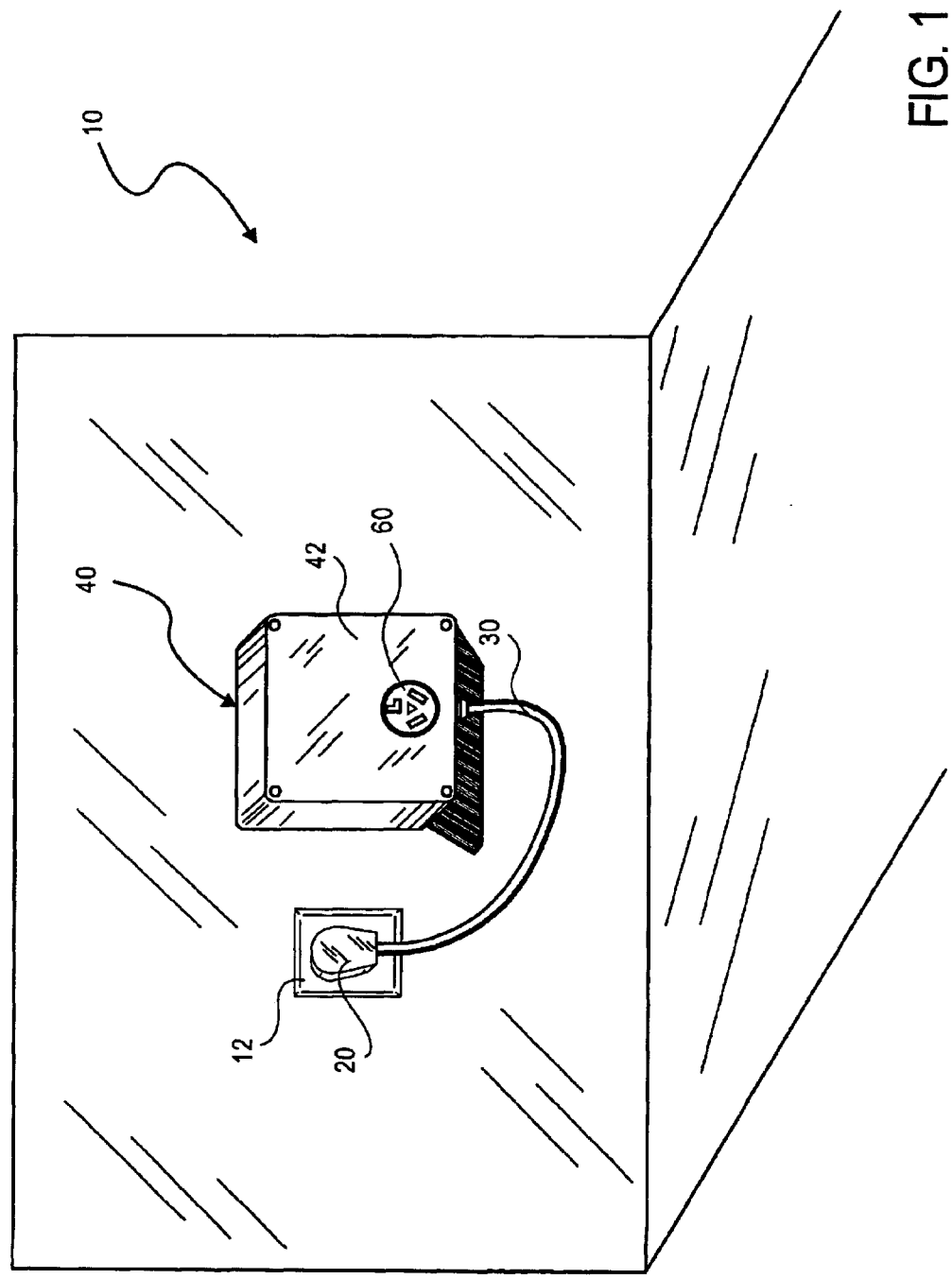
FIG. 1 is an upper perspective view of the present invention electrically connected to a wall outlet.

Turning now descriptively to the drawings, in which similar reference characters denote similar elements throughout the several views, FIGS. 1 through 11 illustrate a power line phase coupler system 10, which comprises a housing 40, a female connector 60 positioned within the housing 40, a male connector 20 electrically connected to the female connector 60 by a length of cord 30, and a repeater coupler 50 electrically connected to the male connector 20. The repeater coupler 50 is electrically connected between Phase A and Phase B of the male connector 20 for repeating and amplifying a data signal received from either phase to the opposite phase.

A conventional power line system of a building typically has a Phase A power line, Phase B power line and a neutral line wherein Phase A is 180 degrees out of phase with respect to Phase B. Some power line systems have a four line called the ground line. A conventional wall outlet 12 providing dual-phase power typically has three slots for Phase A, Phase B, and neutral. If ground is utilized, the conventional wall outlet 12 will have a fourth slot within. The conventional wall outlet 12 is then capable of providing 240-volt power to an appliance such as a dryer.

As shown in FIGS. 1 through 4 of the drawings, the present invention includes a male connector 20 that electrically mates with the wall outlet 12. The male connector 20 includes a first prong 22, a second prong 24 and a third prong 26 connectable to Phase A, Phase B and the neutral slots of the wall outlet 12 respectively. If the wall outlet 12 has a ground slot, the male connector 20 can include a fourth prong though not shown in the drawings. The male connector 20 may be comprised of various shapes, structures and configurations depending upon the wall outlet 12.

Figure 2:
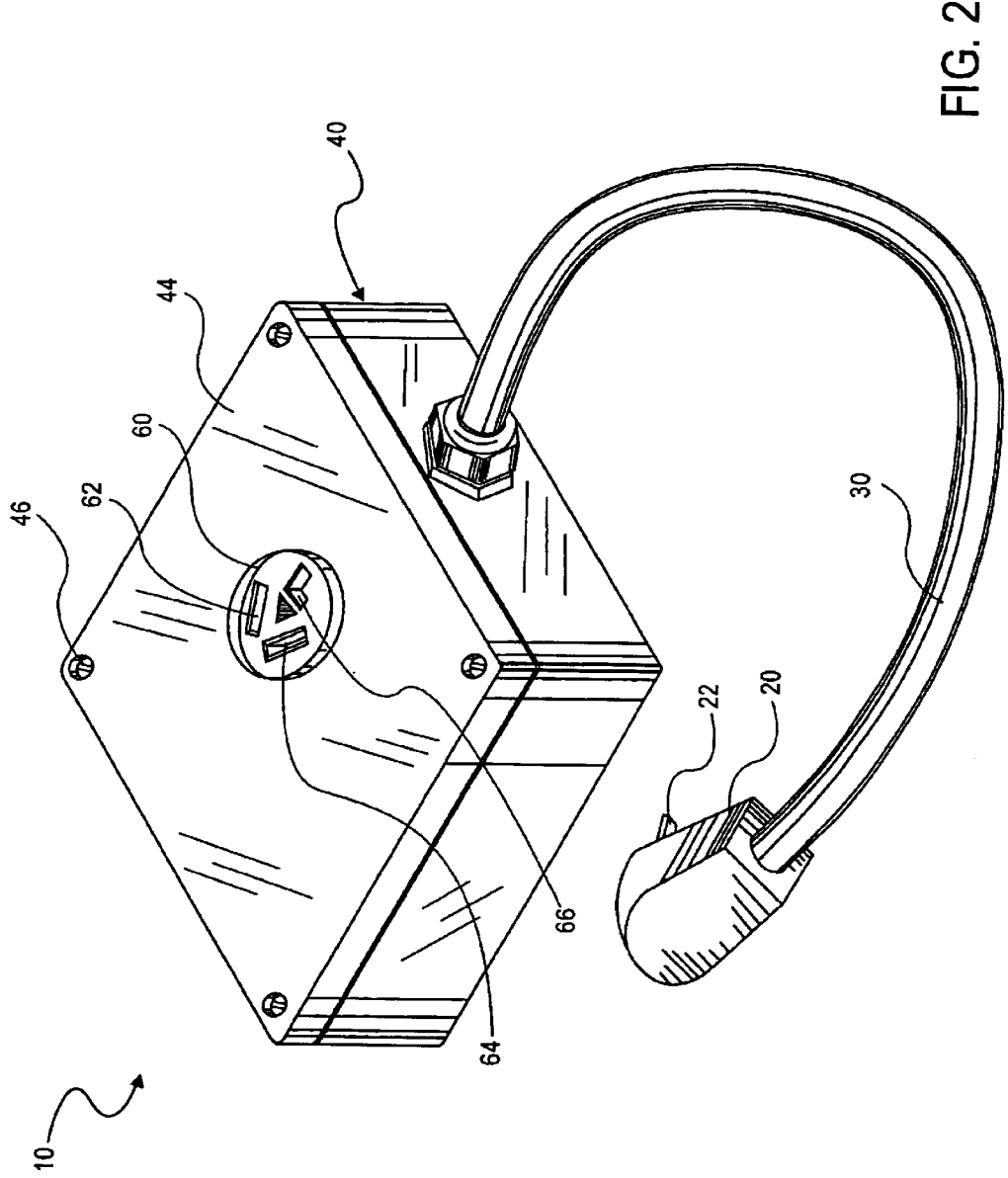
FIG. 2 is an upper perspective view of the present invention.
Figure 3:
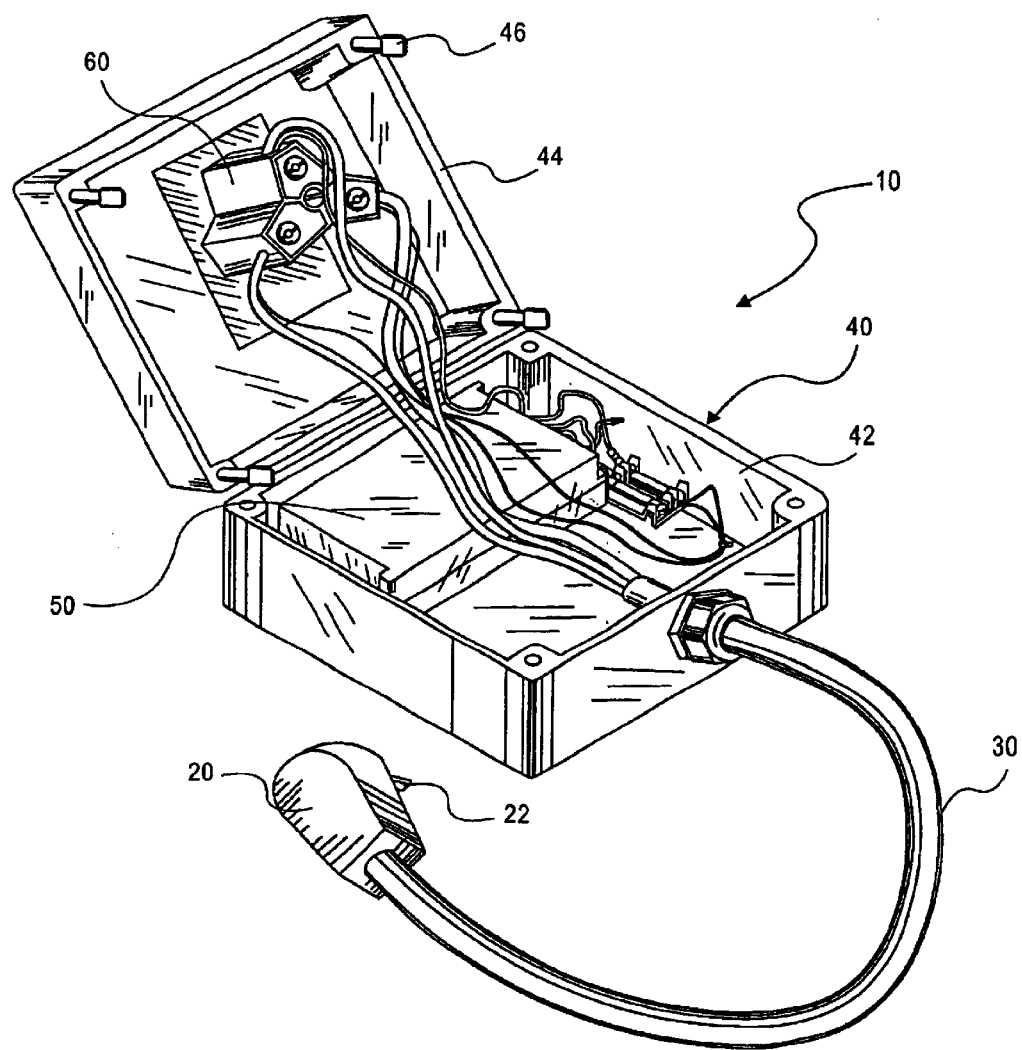
FIG. 3 is an upper perspective view of the present invention with the cover partially removed.
Figure 4:
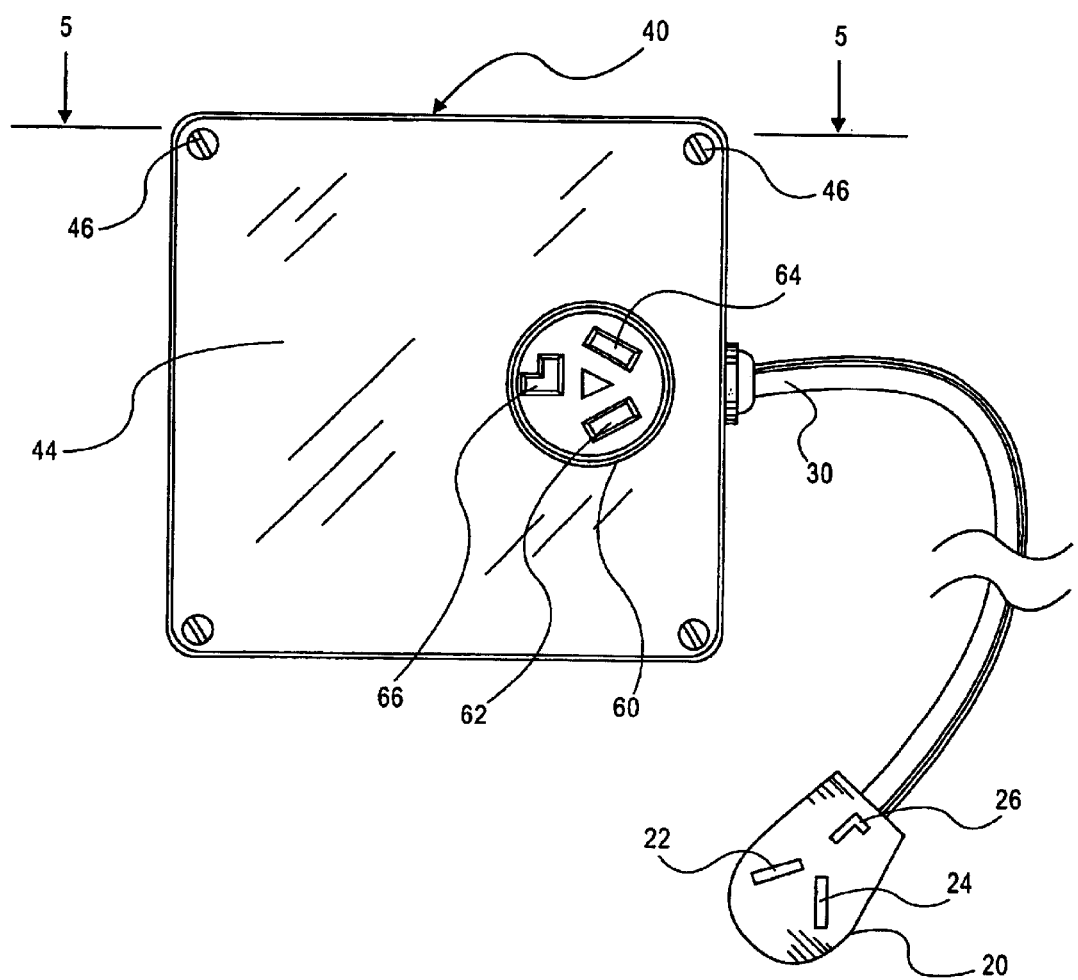
FIG. 4 is a top view of the present invention.

The male connector 20 preferably has a flat profile for not interfering with the surrounding electrical appliances as best shown in FIGS. 1 through 3 of the drawings. A length of power cord 30 is electrically connected to the male connector 20 has includes three or four wires depending upon the number of prongs utilized within the male connector 20. The cord 30 preferably extends downwardly from the male connector 20 to maintain a flat profile when utilized with the wall outlet 12. The cord 30 is preferably of sufficient length to allow positioning of the housing 40 in a convenient location for insertion of a power connector from an electrical appliance.

As shown in FIGS. 1 through 5 of the drawings, the housing 40 has an interior cavity 42 for storing the repeater coupler 50 and various other electrical equipment. The housing 40 preferably has a removable cover 44 that is attachable by a plurality of fasteners 46 as best shown in FIGS. 2 and 3 of the drawings. Various other connection means may be utilized to secure the cover 44 to the housing 40. The housing 40 is preferably constructed of a flat structure and may have various shapes and structures.

Figure 5:
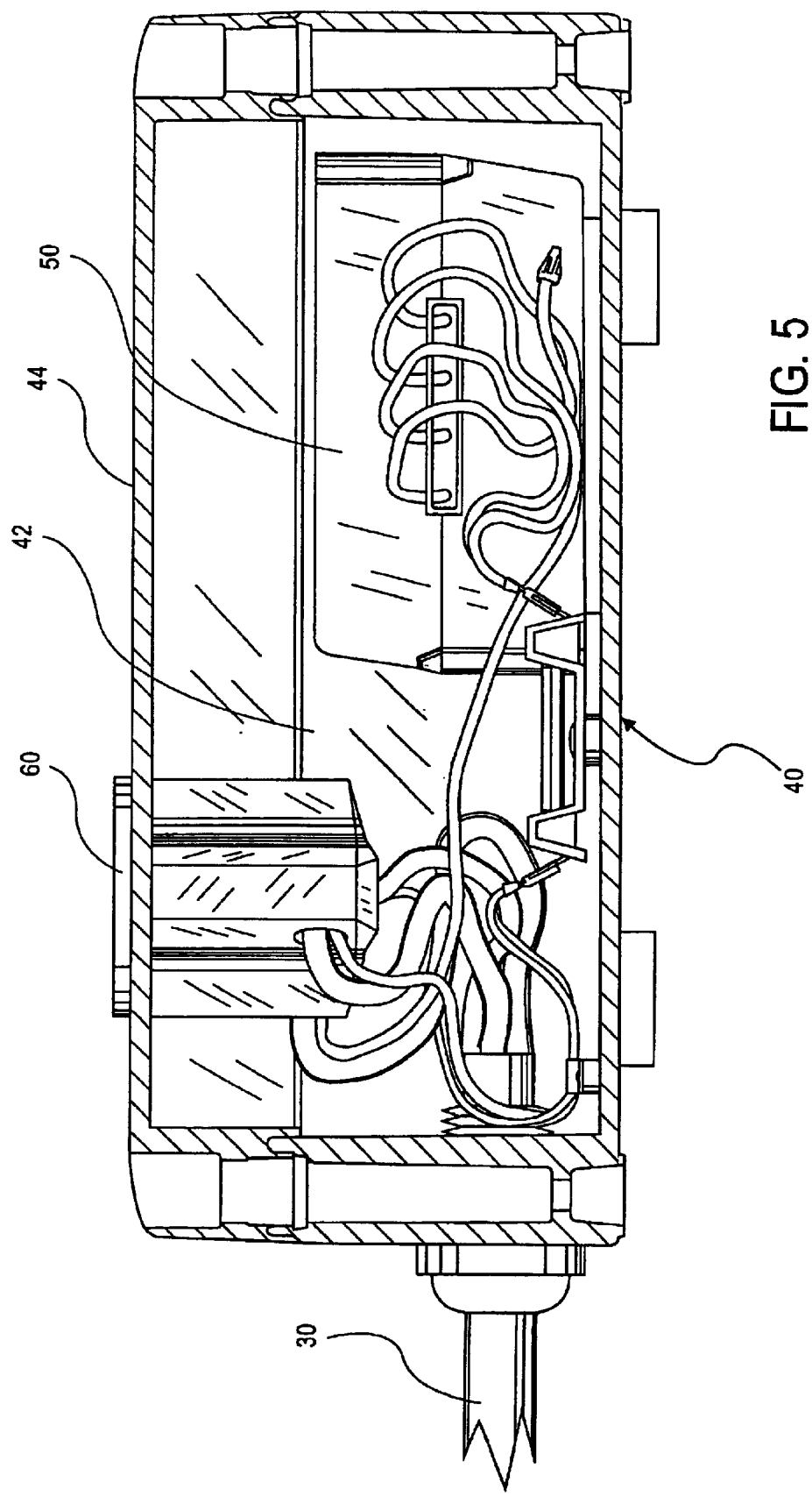
FIG. 5 is a cutaway view taken along line 5—5 of FIG. 4 of the drawings.
Figure 7:
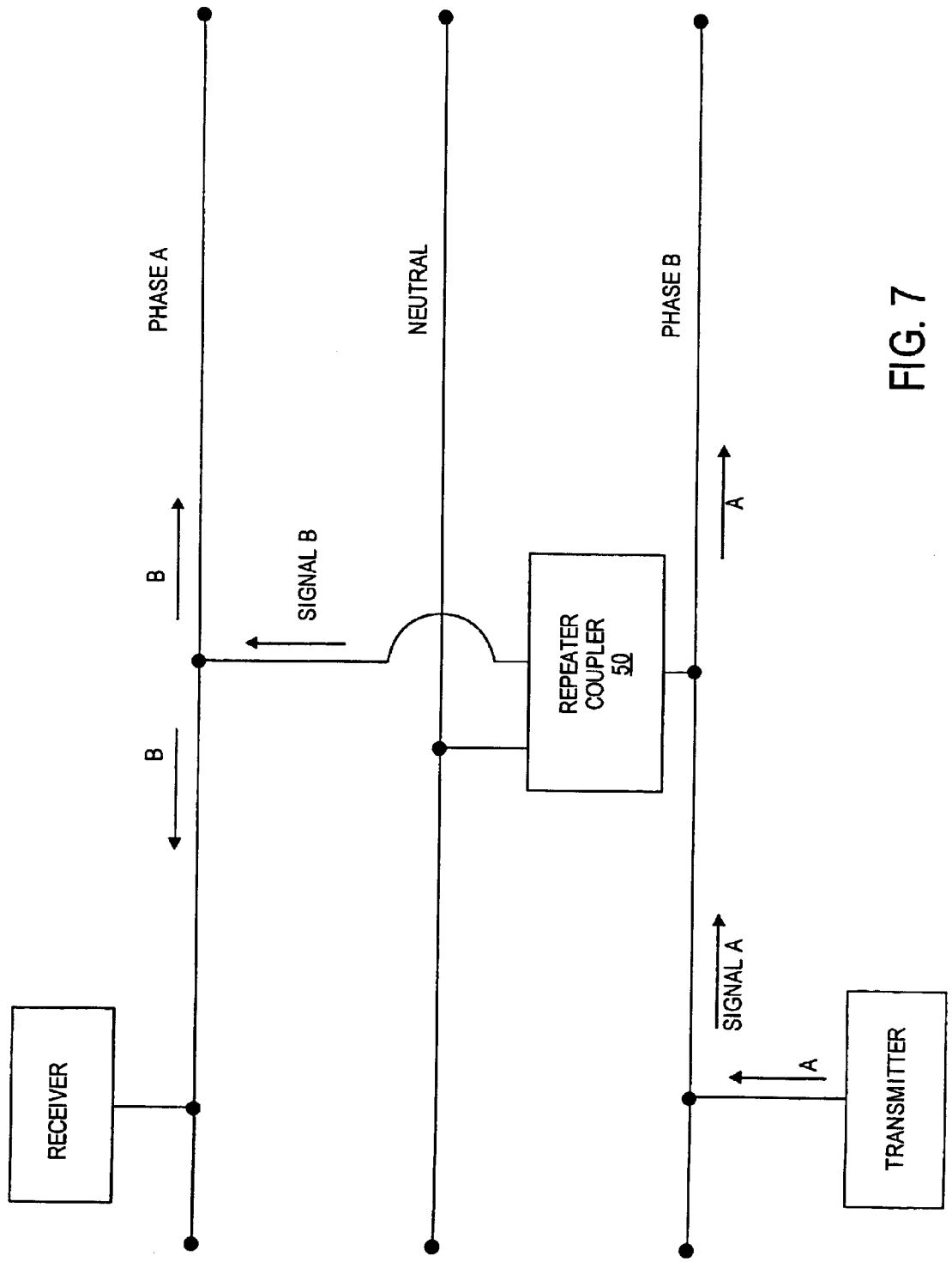
FIG. 7 is a schematic illustration of the repeater coupler electrically connected between the two phases of a power line.

As shown in FIGS. 3 and 5 of the drawings, a repeater coupler 50 is positioned within the interior cavity 42 of the housing 40. The repeater coupler 50 is electrically connected to the power cord 30 opposite of the male connector 20 for allowing coupling of Phase A and Phase B of the power line system of the building structure. The repeater coupler 50 receives power from either of the phases and the neutral line. More specifically, the repeater coupler 50 is electrically connected between the wires of the cord 30 corresponding to Phase A and Phase B of the power line system as best shown in FIG. 7 of the drawings.

The repeater coupler 50 is comprised of an amplifier structure that detects a data signal sent along either of the phases within the power line system and then repeats the data signal to the other power line phase at an amplified level. The repeater coupler 50 does not allow the 60 Hz power signal to pass between the phases, but rather only repeats and amplifies higher frequencies of data signals over 1 KHz.

In addition, the following product is considered relevant to the repeater coupler 50 structure and functionality of the present invention and is incorporated herein by reference: LEVITON 6201 system coupler repeater. The aforementioned product, which is mentioned elsewhere in this disclosure, and which form a part of this disclosure, may be applied in any known manner by those skilled in the art in order to practice various embodiments of the present invention. The following patents are considered relevant to the repeater coupler 50 structure and functionality of the present invention and are incorporated herein by reference: U.S. Pat. No. 4,032,911 entitled "Signal Repeater For Power Distribution Line Communication Systems"; U.S. Pat. No. 3,973,087 entitled "Signal Repeater For Power Line Access Data System" and U.S. Pat. No. 3,911,415 entitled "Distribution Network Power Line Carrier Communication System." The aforementioned patents may be applied in any known manner by those skilled in the art in order to practice various embodiments of the present invention.

Figure 6:
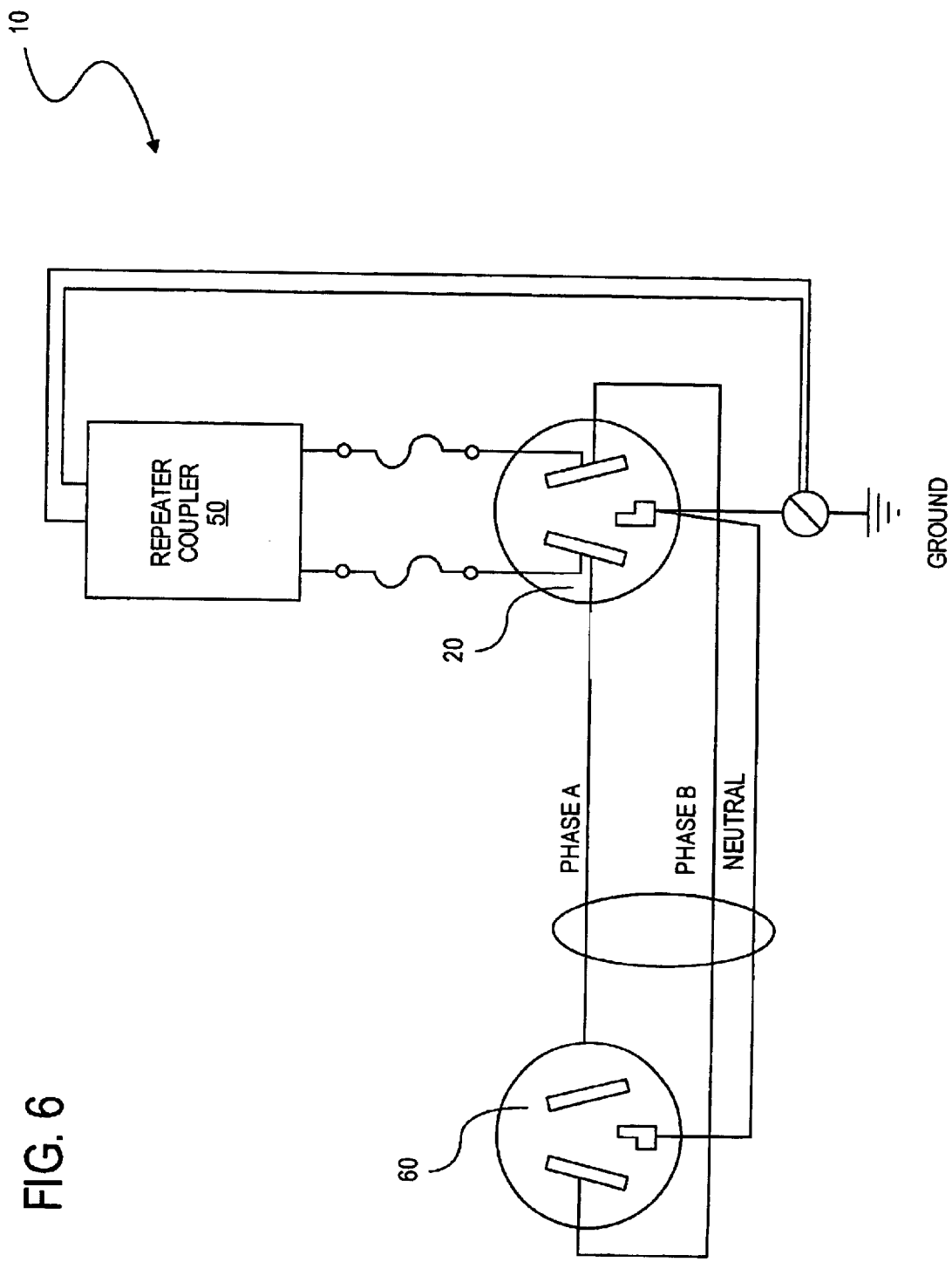
FIG. 6 is a schematic illustration of the present invention.

A female connector 60 is preferably positioned within the housing 40 as best shown in FIGS. 1 through 6 of the drawings. It can be appreciated that the female coupler 60 does not have to be utilized within the present invention where the female coupler 60 is not required. The female connector 60 is electrically connected to the three wires within the power cord 30 in parallel to the repeater coupler 50. The female connector 60 is formed for electrically receiving a power connector from an electrical appliance such as a dryer to allow the electrical power to be transferred from the power line system of the building to the electrical appliance. The female connector 60 includes a first slot 62, a second slot 64 and a third slot 66 connectable to Phase A, Phase B and the neutral slots of the power cord 30 opposite of the male connector 20 as best shown in FIG. 6 of the drawings. The female connector 60 includes a fourth slot if a ground wire is included within the power cord 30.

Figure 8:
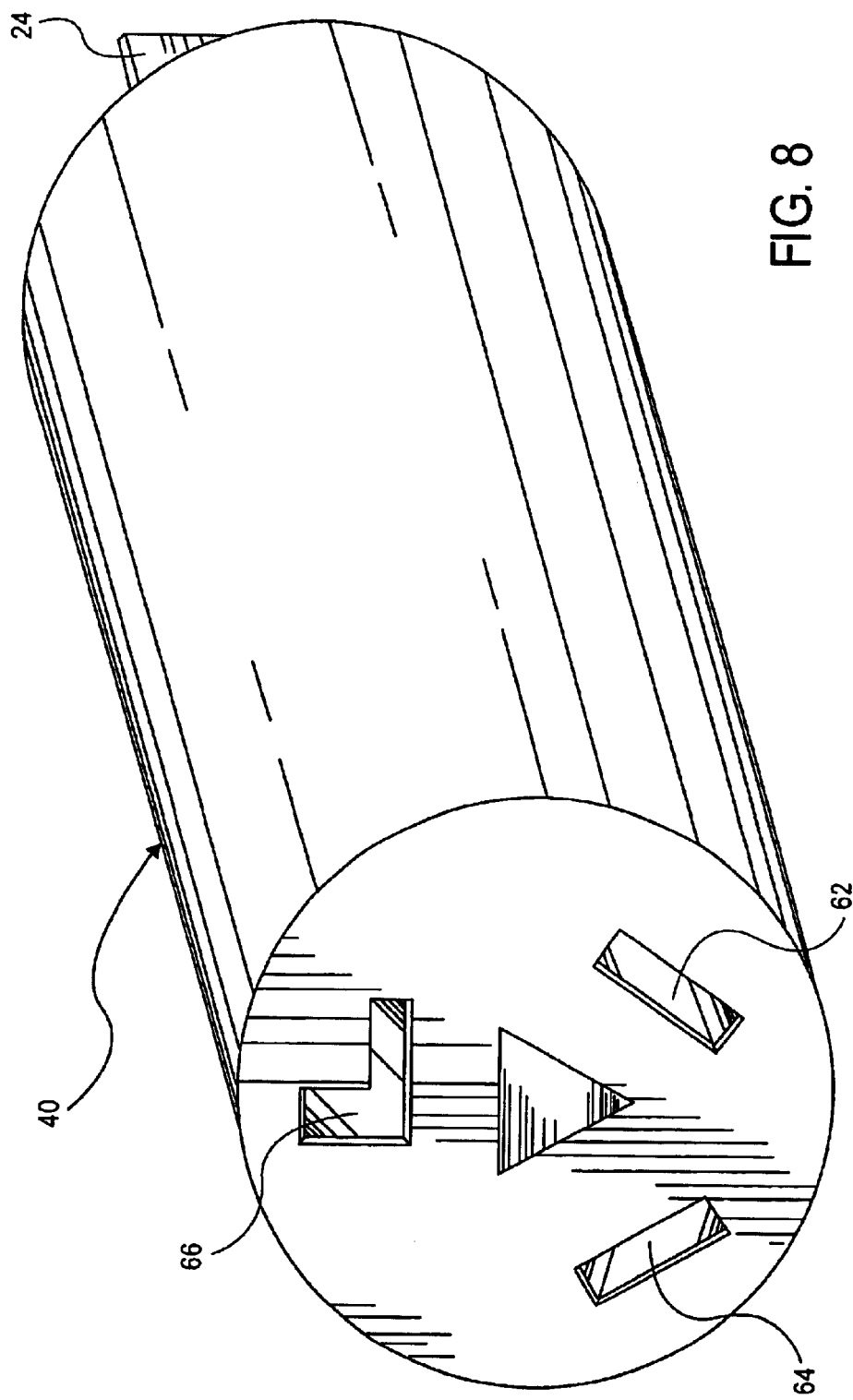
FIG. 8 is an upper perspective view of a first embodiment of the present invention.
Figure 9:
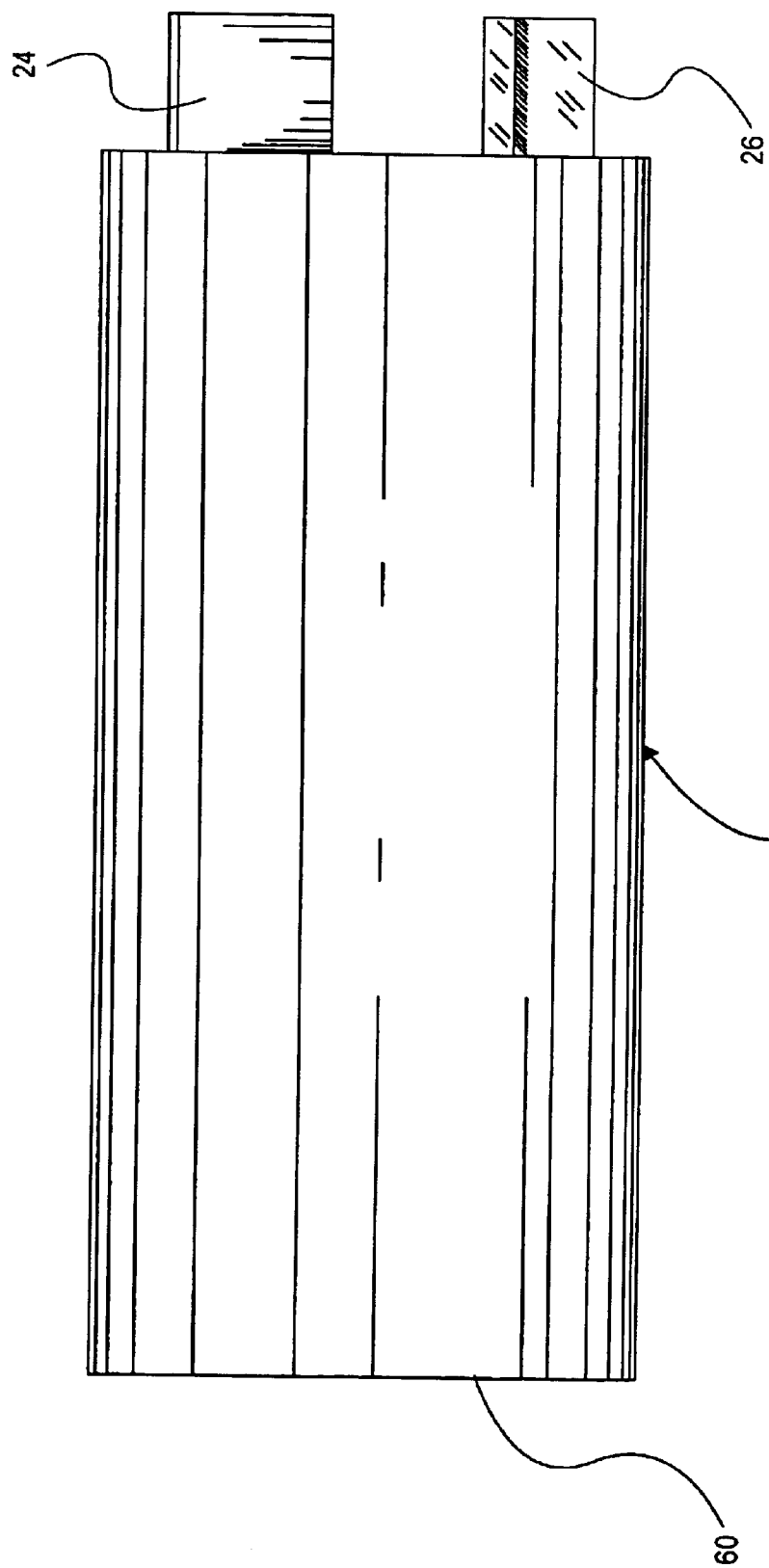
FIG. 9 is a side view of the first embodiment of the present invention.

As shown in FIGS. 8 and 9 of the drawings, a first alternative embodiment of the present invention is provided that eliminates the usage of the power cord 30. The housing 40 for the first alternative embodiment is generally comprised of a tubular structure having opposing ends thereof. The male connector 20 and the female connector 60 at attached to the opposing ends of the tubular housing 40 as best shown in FIG. 9 of the drawings. The electrical connections of the male connector 20, the female connector 60 and the repeater coupler 50 are not changed for the first alternative embodiment as can be appreciated providing the same effect as the main embodiment in a more compact structure.

Figure 10:
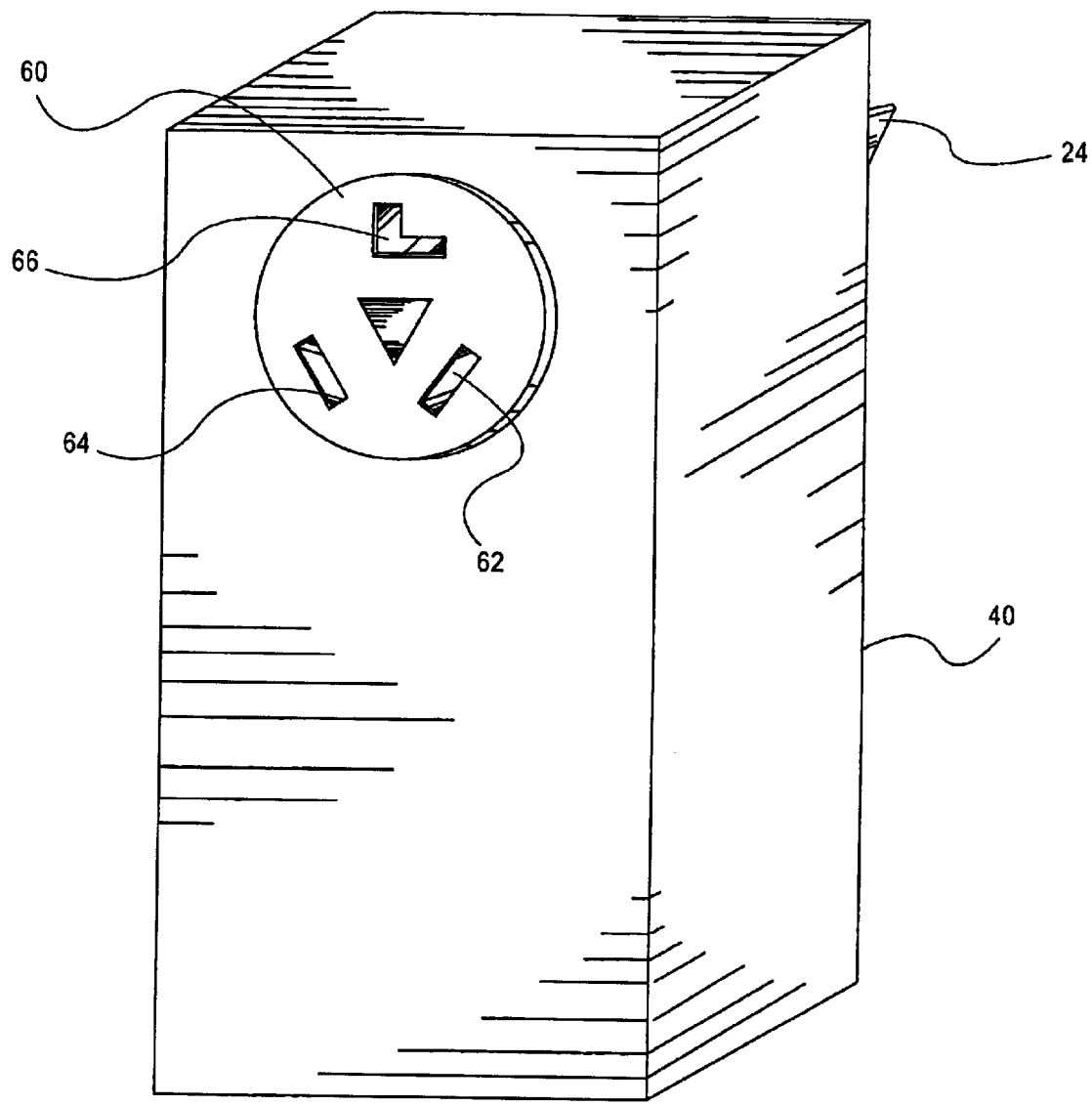
FIG. 10 is an upper perspective view of a second embodiment of the present invention.
Figure 11:
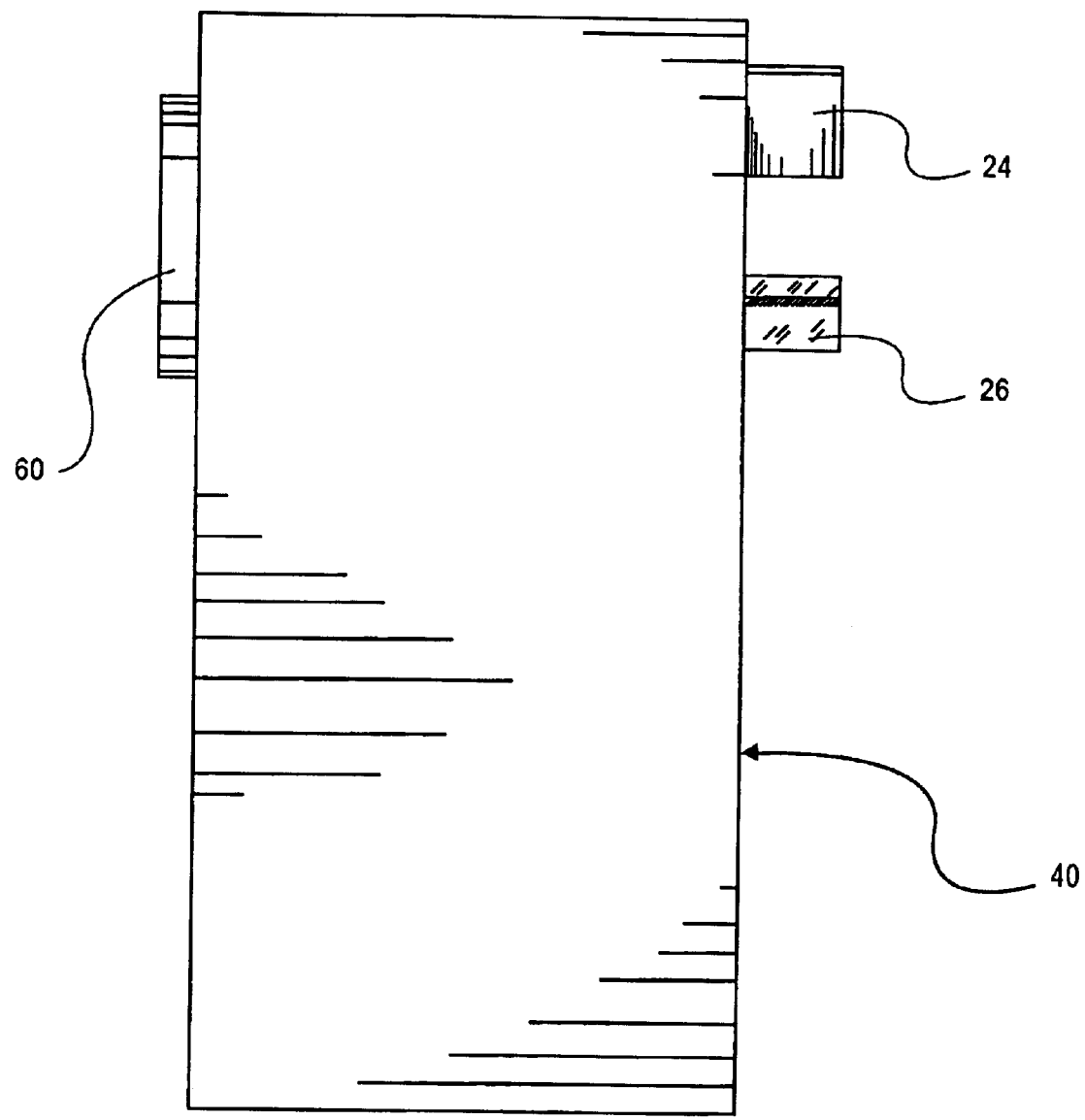
FIG. 11 is a side view of the second embodiment of the present invention.

As shown in FIGS. 10 and 11 of the drawings, a second alternative embodiment of the present invention is provided that eliminates the usage of the power cord 30 similar to the first alternative embodiment. The housing 40 for the second alternative embodiment is generally comprised of a flat structure having a front surface and a rear surface. The male connector 20 and the female connector 60 at attached to the opposing surfaces of the housing 40 as best shown in FIG. 11 of the drawings. The electrical connections of the male connector 20, the female connector 60 and the repeater coupler 50 are not changed for the second alternative embodiment as can be appreciated providing the same effect as the main embodiment in a more compact structure.

In use, the user electrically connects the male connector 20 to a conventional wall outlet 12 of a building structure wherein the wall outlet 12 is electrically coupled to both Phase A and Phase B of the power line system. If a transmitter device electrically connected to the power line system via another wall outlet 12 transmits a data signal along one of the power line phases, the data signal is then detected by the repeater coupler 50. The repeater coupler 50 then repeats, amplifies and tags this data signal to the other power line phase to be received by the desired receiver device electrically connected to that power line phase. An example of this operation is shown in FIG. 7 of the drawings. If data signal A enters Phase B of the power line system by a transmitter device, the repeater coupler 50 detects/receives data signal A and then converts data signal A to data signal B that is transmitted to Phase A which is properly received by the receiver device. Signal B is simply an amplified signal A with a "tag" positioned within to prevent repeating a second time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A power line phase coupler system, comprising:
   a length of power cord having a male connector electrically connected thereto, wherein said male connector is formed to electrically engage a multi-phase wall outlet having at least a Phase A, a Phase B and a neutral; and
   a repeater coupler electrically connected to said power cord opposite of said male connector, wherein said repeater coupler transmits high frequency communications between said Phase A and said Phase B.

2. The power line phase coupler system of claim 1, wherein said repeater coupler receives a transmitted high frequency communication from Phase A or Phase B, and wherein said repeater coupler transmits a repeated high frequency communication to another phase at an amplified level.

3. The power line phase coupler system of claim 2, wherein said repeater coupler includes an identifier tag within said repeated high frequency communication.

4. The power line phase coupler system of claim 3, wherein said repeater coupler does not repeat high frequency communications with said identifier tag.

5. The power line phase coupler system of claim 4, wherein said repeater coupler includes a housing having an interior cavity.

6. The power line phase coupler system of claim 5, including a female connector positioned within said housing and electrically connected to said power cord, wherein said female connector is formed for receiving a multi-phase male connector for allowing multi-phase electrical power to pass from said multi-phase wall outlet to said multi-phase male connector.

7. The power line phase coupler system of claim 6, wherein said male connector includes at least a first prong, a second prong and a third prong electrically connectable to said Phase A, said Phase B and said neutral of said multi-phase wall outlet.

8. The power line phase coupler system of claim 7, wherein said female connector includes at least a first slot, a second slot and a third slot electrically connected to said first prong, said second prong and said third prong by said power cord.

9. The power line phase coupler system of claim 8, wherein said power cord includes at least a first wire, a second wire and a third wire electrically connected respectively between said first prong and said first slot, said second prong and said second slot, and said third prong and said third slot, wherein said repeater coupler is electrically connected between said first wire and said second wire.

10. The power line phase coupler system of claim 9, wherein said housing includes an interior cavity.

11. A power line phase coupler system, comprising:
    a housing having a first side and a second side, wherein said first side of said housing includes a male connector, wherein said male connector is formed to electrically engage a multi-phase wall outlet having at least a Phase A, a Phase B and a neutral; and
    a repeater coupler electrically connected to said male connector, wherein said repeater coupler transmits high frequency communications between said Phase A and said Phase B.

12. The power line phase coupler system of claim 11, wherein said repeater coupler receives a transmitted high frequency communication from Phase A or Phase B, and wherein said repeater coupler transmits a repeated high frequency communication to another phase at an amplified level.

13. The power line phase coupler system of claim 12, wherein said repeater coupler includes an identifier tag within said repeated high frequency communication.

14. The power line phase coupler system of claim 13, wherein said repeater coupler does not repeat high frequency communications with said identifier tag.

15. The power line phase coupler system of claim 14, including a female connector positioned within said housing and electrically connected to said power cord, wherein said female connector is formed for receiving a multi-phase male connector for allowing multi-phase electrical power to pass from said multi-phase wall outlet to said multi-phase male connector.

16. The power line phase coupler system of claim 15, wherein said male connector includes at least a first prong, a second prong and a third prong electrically connectable to said Phase A, said Phase B and said neutral of said multi-phase wall outlet.

17. The power line phase coupler system of claim 16, wherein said female connector includes at least a first slot, a second slot and a third slot electrically connected to said first prong, said second prong and said third prong.

18. The power line phase coupler system of claim 17, including a first wire, a second wire and a third wire electrically connected respectively between said first prong and said first slot, said second prong and said second slot, and said third prong and said third slot, wherein said repeater coupler is electrically connected between said first wire and said second wire.

19. The power line phase coupler system of claim 18, wherein said housing is tubular shaped with said first side and second side on opposing sides of said housing.

20. The power line phase coupler system of claim 18, wherein said first side and second side are on opposing sides of said housing and are parallel.

21. A power line phase coupler system, comprising:

a housing having an interior cavity;

a length of power cord extending from the housing having a male connector electrically connected thereto, wherein said male connector is formed to electrically engage a multi-phase wall outlet having at least a Phase A, a Phase B and a neutral;

a repeater coupler disposed in said circuitry electrically connected to said power cord opposite of said male connector; and a female connector positioned within said housing and electrically connected to said power cord, wherein said female connector is formed for receiving a multi-phase male connector for allowing multi-phase electrical power to pass from said multi-phase wall outlet to said multi-phase male connector, wherein said repeater coupler transmits high frequency communications between said Phase A and said Phase B, when said repeater coupler receives a transmitted high frequency communication from one of Phase A or Phase B, said repeater coupler transmits a repeated high frequency communication to the other phase at an amplified level.

22. The power line phase coupler system of claim 21, where said female connector includes at least a first slot, a second slot and a third slot electrically connected to said first prong, said second prong and said third prong by said power cord.

23. The power line phase coupler system of claim 22, wherein said power cord includes at least a first wire, a second wire and a third wire electrically connected respectively between said first prong and said first slot, said second prong and said second slot, and said third prong and said third slot, wherein said repeater coupler is electrically connected between said first wire and said second wire.

24. A power line phase coupler system, comprising:

a housing having a first side and a second side, wherein said first side of said housing includes a male connector, wherein said male connector is formed to electrically engage a multi-phase wall outlet having at least a Phase A, a Phase B and a neutral;

a repeater coupler electrically connected to said male connector; and a female connector positioned within said housing and electrically connected to said power cord, wherein said female connector is formed for receiving a multi-phase male connector for allowing multi-phase electrical power to pass from said multi-phase wall outlet to said multi-phase male connector, wherein said repeater coupler transmits high frequency communications between said Phase A and said Phase B;

wherein said repeater coupler receives a transmitted high frequency communication from Phase A or Phase B, said repeater coupler transmits a repeated high frequency communication to the other phase at an amplified level.

25. The power line phase coupler system of claim 24, wherein said male connector includes at least a first prong, a second prong and a third prong electrically connectable to said Phase A, said Phase B and said neutral of said multi-phase wall outlet.

26. The power line phase coupler system of claim 25, wherein said female connector includes at least a first slot, a second slot and a third slot electrically connected to said first prong, said second prong and said third prong.

27. The power line phase coupler system of claim 26, wherein said first side and second side are on opposing sides of said housing and are parallel.

* * * * *